United States Patent
Ouellette

(10) Patent No.: US 6,712,195 B1
(45) Date of Patent: Mar. 30, 2004

(54) CONVEYOR APPARATUS WITH CUSHIONING HOLDBACK BAR

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 10/355,345

(22) Filed: Jan. 31, 2003

(51) Int. Cl.⁷ ............................................. B65G 47/26
(52) U.S. Cl. .................................. 198/459.6; 198/463.4
(58) Field of Search ........................... 198/459.6, 463.4

(56) References Cited

U.S. PATENT DOCUMENTS

| | | | | |
|---|---|---|---|---|
| 903,591 A | * | 11/1908 | Long ...................... | 198/459.6 |
| 3,084,779 A | * | 4/1963 | Mladek et al. ........... | 198/463.4 |
| 4,262,468 A | * | 4/1981 | Marchetti ...................... | 53/67 |
| 5,213,189 A | * | 5/1993 | Agnoff .................... | 198/463.4 |
| 5,419,425 A | * | 5/1995 | Goater .................... | 198/461.3 |
| 6,024,205 A | * | 2/2000 | Adalbert .................. | 198/463.3 |
| 6,431,345 B2 | * | 8/2002 | Burgener et al. ......... | 198/461.3 |
| 6,439,369 B1 | * | 8/2002 | Brown .................... | 198/459.6 |
| 6,523,671 B2 | * | 2/2003 | McTaggart et al. ...... | 198/459.6 |

* cited by examiner

*Primary Examiner*—Douglas Hess
(74) *Attorney, Agent, or Firm*—Thompson Coburn LLP

(57) ABSTRACT

A cushioning holdback bar of a conveyor apparatus is provided with a shock absorbing actuator that enables the holdback bar to move in the downstream direction of the conveyor when an array of conveyed objects contacts the holdback bar to cushion the impact of the array of objects with the holdback bar.

20 Claims, 4 Drawing Sheets

CONVEYOR APPARATUS WITH CUSHIONING HOLDBACK BAR

BACKGROUND OF THE INVENTION (1) Field of the Invention

The present invention pertains to a conveyor apparatus that conveys pluralities of objects arranged in two-dimensional arrays on the apparatus, and in particular to a holdback bar that selectively holds back the array of objects on the conveyor and releases the array of objects to be conveyed by the conveyor. More specifically, the present invention pertains to a holdback bar that is provided with a shock absorbing actuator that enables the holdback bar to move in the downstream direction of the conveyor when an array of conveyed objects contacts the holdback bar to cushion the impact of the array of objects with the holdback bar.

(2) Description of the Related Art

Many containers such as bottles, cans, boxes, etc., or other similar objects are packaged on pallets for transportation from a manufacturer to a user of the container or object. The pallet loads often include layers of the objects stacked one on top of another on the pallet. Each of the layers of the objects stacked on the pallet are typically separated from each other by a paperboard tier sheet that is positioned on top of each layer of objects stacked onto the pallet. The layers of objects and the tier sheets on which the layers rest are secured to the top surface of the pallet by banding, plastic sheet wrap or other equivalent methods. The pallet loads facilitate the transportation of a significant number of the objects on each pallet load from the manufacturer of the objects, through distribution and ultimately to the end user of the objects.

Various different types of conveyor apparatus are employed in arranging pluralities of objects into two-dimensional arrays of the objects that ultimately form the layers of the objects stacked on a pallet. Each two-dimensional array of the objects is conveyed by the conveyor apparatus from a portion of the conveyor system where the two-dimensional arrays are formed, to a palletizer that stacks each two-dimensional array of objects as a layer on the pallet. Typically, the layer of objects is stopped several times as it is conveyed by the conveyor system to the palletizer. For example, the layer of objects being conveyed by the conveyor apparatus would be stopped at some point along the conveyor apparatus so that a tier sheet can be positioned on top of the layer of objects.

The layer of objects is usually stopped by a holdback bar that moves into position over the conveying surface of the conveyor apparatus. The layer of objects comes into contact with the holdback bar and is held back by the bar as the conveyor continues to operate beneath the layer of objects. The conveying surface is not stopped so that other packaging procedures conducted along the conveyor can continue. When it is time for the layer of objects to continue along the conveyor path, the holdback bar is removed from its position over the conveyor and the previously held back layer of objects is released to be conveyed by the conveyor apparatus toward the palletizer.

In many conveyor systems in which objects are loaded as two-dimensional arrayed layers onto pallets, the faster the conveyor system can operate to load pallets the more cost efficient is its operation. One way of increasing the speed of the conveyor system is to increase the speed of the conveying surface of the system that conveys the layers of objects to the palletizer. However, the speed of the conveyor apparatus conveying surface cannot be increased to the extent that it will result in disarraying or throwing out of order the two-dimensional arrayed arrangement of the layers of objects conveyed by the conveying surface to the palletizer. For example, it has been observed that increasing the speed of the conveyor apparatus conveying surface increases the force of impact of a two-dimensional arrayed layer of objects with the holdback bar that stops and holds back the layer of objects on the conveying surface. The force of impact of the objects along the front row of the arrayed layer with the holdback bar is transmitted through the two dimensional arrayed arrangement of the objects to the objects in the last row of the array and often results in one or more of the objects in the last row bouncing back from the arrayed arrangement and falling over onto their side. This often causes down time of the conveyor system so that the objects of the arrayed layer that have fallen onto their side can be manually repositioned in the ordered two-dimensional arrayed arrangement before being conveyed further by the conveyor system to the palletizer. The down time of the conveyor system to reposition fallen objects into their two-dimensional arrayed layer arrangement defeats the purpose of operating the conveyor surface at an increased speed, i.e. increased cost efficiency of the conveyor system operation.

SUMMARY OF THE INVENTION

The conveyor apparatus of the present invention overcomes the shortcomings of the prior art conveyor apparatus described above by providing a cushioning holdback bar. The cushioning holdback bar cushions the impact of a two-dimensional arrayed layer of objects with the holdback bar in holding back the objects on the conveying surface and thereby prevents objects in the last row of the layer from falling over on their sides due to the impact of the layer with the holdback bar. As a result, the conveying surface of the conveyor apparatus can be operated at increased speeds without the drawback of the two-dimensional arrayed layer of objects impacting with the holdback bar causing several of the objects in the last row of the layer to fall over. Because the cushioning holdback bar of the invention enables the conveying surface of the conveyor apparatus to be operated at an increased speed, the cost efficiency of the conveyor apparatus is increased.

The conveyor cushioning holdback bar of the invention can be used in any portion of a conveyor system where it is desired to selectively hold back objects conveyed on the conveying surface of the system and release the objects to be further conveyed by the conveying surface of the system. The cushioning holdback bar can be used to holdback objects conveyed by the conveying surface in a single file line, or the cushioning holdback bar of the invention could be used to holdback two-dimensional arrayed arrangements of objects on the conveying surface. In the operative environment of the invention described herein, the cushioning holdback bar of the invention is employed with a conveyor apparatus that has a conveying surface that supports and conveys two-dimensional arrayed arrangements of objects.

The conveyor apparatus of the invention comprises a conveyor surface having a longitudinal length with opposite upstream and downstream ends. In the preferred embodiment the conveying surface is a moveable surface that supports and conveys pluralities of objects in a downstream direction from the upstream end of the conveying surface to the downstream end of the conveying surface.

The holdback bar of the invention is positioned over the conveying surface with the holdback bar extending laterally across the conveying surface. The holdback bar is moveable between lowered and raised positions of the bar relative to the conveying surface. In the lowered position of the holdback bar it is positioned to contact objects conveyed on the conveying surface and hold back those objects from moving further downstream as the conveying surface continues to move beneath the held back objects. When the holdback bar is elevated to its raised position over the conveying surface it releases the previously held back objects and allows them to be further conveyed in the downstream direction by the conveying surface.

An actuator is connected to the holdback bar. The actuator enables limited longitudinal movement of the holdback bar between first and second positions of the bar relative to the conveying surface. In the first position of the bar a two-dimensional arrayed arrangement of objects conveyed on the conveying surface are held back by the bar and are positioned at a desired position along the conveyor apparatus where a further process in the palletizing of the arrayed objects can be performed on the objects. In the illustrative example, the holdback bar in its first position holds the two-dimensional arrayed arrangement of objects on the conveying surface in a position where a tier sheet is deposited on top of the arrayed arrangement of objects. The second position of the holdback bar is spaced longitudinally in the downstream direction and vertically above the first position of the holdback bar.

In the preferred embodiment of the invention the actuator is a pneumatic cylinder and piston assembly. The cylinder and piston assembly is selectively supplied with air pressure to extend and retract a piston rod of the assembly relative to the cylinder and respectively move the holdback bar between its second and first positions.

A fluid pressure circuit communicates with the actuator. The circuit includes a plurality of valves, preferably solenoid operated valves, that selectively supply fluid pressure to the cylinder of the actuator to selectively extend and retract the piston rod of the actuator. Operation of the fluid circuit solenoid valves is controlled by a programmable logic computer. The computer controls the operation of the valves in response to signals it receives from a sensor positioned along the conveyor conveying surface adjacent the first position of the holdback bar.

In operation of the conveyor cushioning holdback bar of the invention, the holdback bar is held in its first position by the fluid circuit supplying the actuator with a low fluid pressure that retracts the piston and piston rod of the actuator in the actuator cylinder. As a layer of objects approaches the holdback bar on the conveying surface the layer will eventually reach the sensor positioned along the conveying surface. The sensor senses the presence of the arrayed layer of objects approaching the holdback bar and provides a signal to the programmable logic computer which in turn stops all fluid pressure being supplied to the actuator and exhausts the actuator cylinder. This causes the actuator cylinder to be in a neutral state with the piston and piston rod of the actuator being free floating in the cylinder. The programmable logic computer also generates a short adjustable time delay in response to receiving the signal from the sensor. The time delay is determined to coincide the downstream movement of the layer of objects on the conveying surface with controlling the fluid circuit to supply one side of the actuator with a low pressure that causes the piston and piston rod to move to their extended positions relative to the actuator cylinder. The movement of the piston and piston rod also causes the holdback bar to move from its first position towards its second position. The low pressure supplied to the actuator causes the holdback bar to move in the downstream direction from its first position toward its second position at a reduced rate of speed compared to the speed of movement of the layer of objects being conveyed by the conveying surface.

The difference in the rate of speed of the holdback bar and the rate of speed of the layer of objects will result in the layer of objects coming into contact with the holdback bar at a more gentle impact as compared to the layer of objects being stopped by a stationary holdback bar. As the arrayed layer of objects contacts the slower moving holdback bar, the arrayed layer of objects is restrained from moving at the higher speed of the conveying surface to move at the slower speed of the holdback bar creating a slowdown and cushioning effect of the holdback bar as it brings the layer of objects to a stop on the conveying surface. In this way, the actuator of the holdback bar functions as a shock absorber as it decelerates the layer of objects and brings the layer of objects conveyed on the conveying surface to a stop at an intermediate position of the holdback bar between the bar first and second positions.

The programmable logic computer then controls the fluid circuit to supply a low pressure to the opposite second side of the actuator cylinder while exhausting the air previously supplied to the one side of the actuator causing the piston and piston rod to move toward their retracted positions relative to the cylinder. This causes the holdback bar to move the two-dimensional arrayed layer of objects in an upstream direction, opposite the downstream direction, over the conveying surface. The two-dimensional arrayed layer of objects is gently forced to move upstream against the downstream motion of the conveying surface until the holdback bar reaches its first position. The further packaging procedures can then be performed on the arrayed layer of objects, for example a tier sheet can then be placed on the top of the arrayed layer of objects.

When the held back arrayed layer of objects and its tier sheet are ready for further downstream movement along the conveyor system, the programmable logic computer controls the fluid circuit to supply high pressure to the actuator cylinder that causes the piston and piston rod of the actuator to move quickly to their extended positions relative to the cylinder. The forward or downstream stroke of the piston and piston rod rapidly moves the holdback bar in the downstream direction separating the bar from the held back two-dimensional arrayed layer of objects. Simultaneously, the holdback bar is elevated to its raised position relative to the conveying surface. The downstream and upward movement of the holdback bar allows the two-dimensional arrayed layer of objects to clear the hold back bar as the layer of objects is conveyed by the conveying surface in the downstream direction. After the layer of objects conveyed by the conveying surface has cleared the area of the holdback bar as sensed by the sensor, the programmable logic computer then controls the fluid circuit to return the holdback bar to its first position relative to the conveying surface.

The conveyor cushioning holdback bar of the invention described above overcomes disadvantages associated with prior art holdback bars in that it cushions its impact with a two-dimensional arrayed layer of objects conveyed on a conveying surface. The cushioned impact of the bar with the two-dimensional arrayed layer of objects allows the conveying surface to be operated at an increased speed which increases the cost-efficiency of operation of the conveyor system.

BRIEF DESCRIPTIONS OF THE DRAWING FIGURES

Further features of the inventions are set forth in the following detailed description of the preferred embodiment of the invention and in the drawing figures wherein.

DETAILED DESCRIPTION OF THE PREFERRED EMBODIMENT

Figure 1:
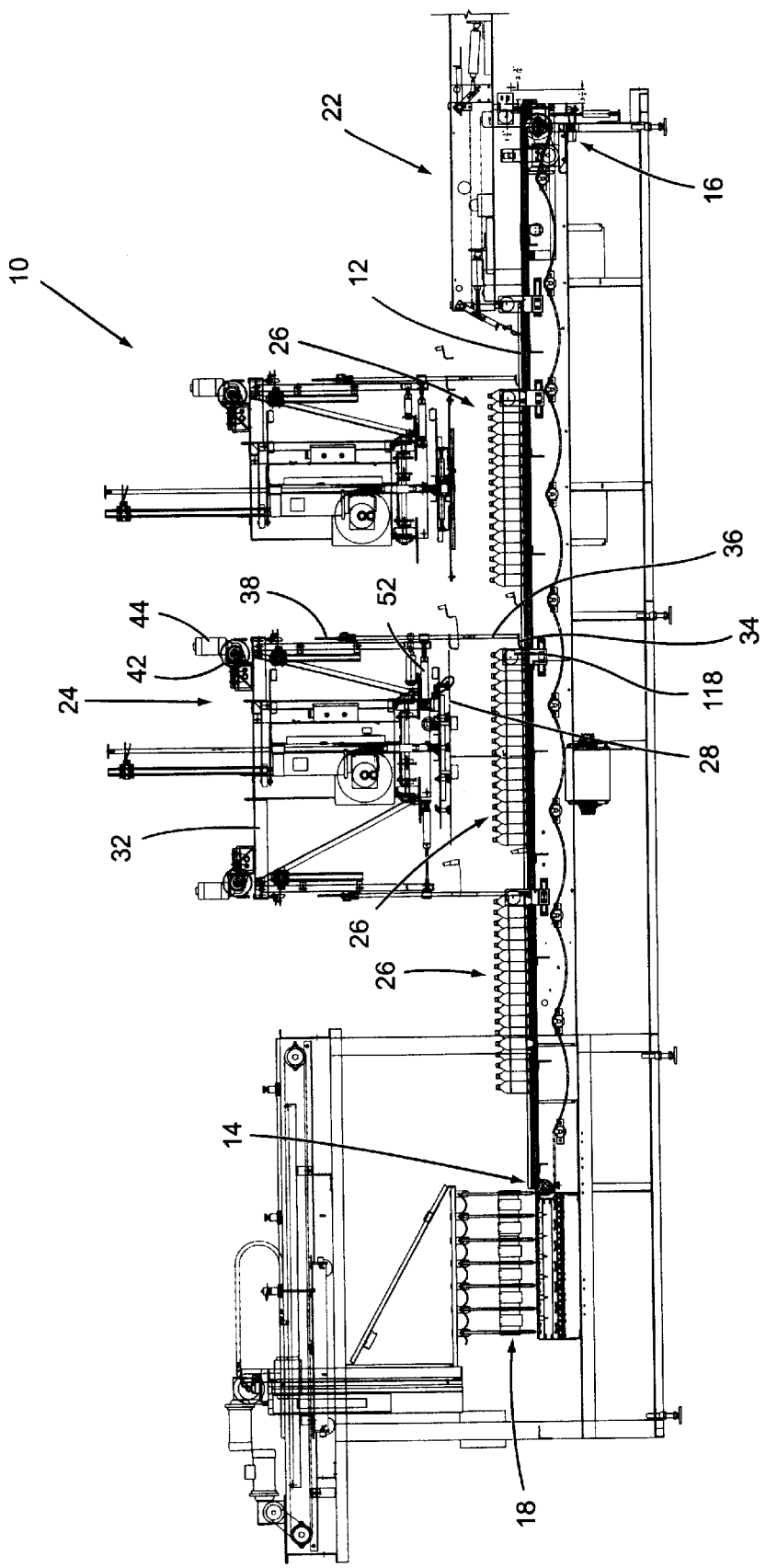
FIG. 1 is a side elevation view of a conveyor apparatus employing the conveyor cushioning holdback bar of the present invention.

FIG. 1 shows the operative environment of a conveyor apparatus 10 with which the cushioning holdback bar of the present invention may be used. The conveyor apparatus 10 of FIG. 1 is basically comprised of a conveying surface 12 provided by a belt-type or chain conveyor that has a longitudinal length between opposite upstream 14 and downstream 16 ends of the conveying surface. An object row former 18 is provided adjacent to the conveying surface upstream end 14. The object row former 18 forms pluralities of objects, in the illustrative environment the objects are blow molded plastic bottles, in two dimensional arrays on the conveying surface 12. A sweep mechanism 22 of a palletizer (not shown) is positioned at the downstream end 16 of the conveying surface. The conveyor cushioning holdback bar assembly 24 of the present invention is positioned along the length of the conveying surface 12 between its upstream 14 and downstream 16 ends. In the illustrative environment shown in FIG. 1 the holdback bar assembly 24 is employed to holdback two dimensional arrayed layers of objects 26, i.e., the blow molded bottles, while a tier sheet 28 is positioned on top of the layer of bottles. However, it is emphasized that the operative environment shown in FIG. 1 is only one environment in which the cushioning holdback bar assembly 24 of the invention may be employed.

The conveyor cushioning holdback bar assembly 24 of the invention can be used in any portion of a conveyor system where it is desired to selectively hold back objects conveyed on the conveying surface of the system and release the objects to be further conveyed by the conveying surface of the system. The cushioning holdback bar assembly 24 can be used to hold back objects conveyed by the conveying surface in a single file line, or the cushioning holdback bar assembly 24 could be used to hold back two dimensional arrayed arrangements of objects on the conveying surface. In addition, the cushioning holdback bar assembly 24 may be employed in holding back objects on a conveying surface for purposes other than the depositing or positioning of a tier sheet 28 on the top of the held back objects.

Although a conveyor employing a moveable conveying surface 12 is shown in the illustrative environment of the invention, the cushioning holdback bar assembly 24 could also be employed with other types of conveyors that do not employ a moving conveyor surface, for example a conveyor system that moves pluralities of objects over a stationary conveying surface by jets of air that are directed through the stationary conveying surface.

Figure 2:
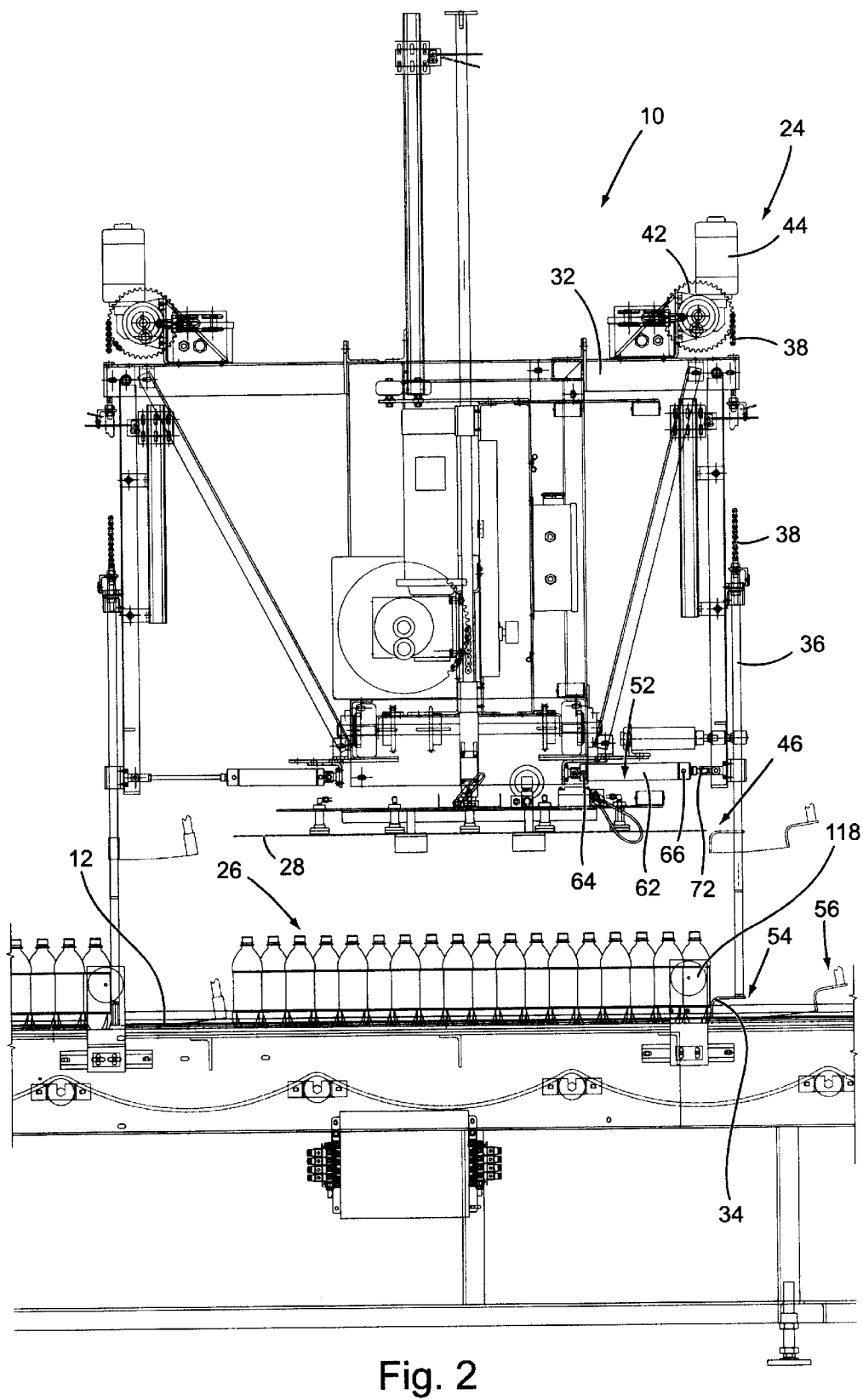
FIG. 2 is an enlarged segment of FIG. 1 showing details of the conveyor with the cushioning holdback bar of the invention.

FIG. 2 is an enlargement of the cushioning holdback bar assembly 24 of the invention shown in FIG. 1. In FIG. 2, as in FIG. 1, the conveyor conveying surface 12 supports and conveys pluralities of objects 26 in a downstream direction along the longitudinal length of the conveying surface from the surface upstream end 14 toward the surface downstream end 16.

The holdback bar assembly 24 comprises a frame 32 that is positioned above the conveying surface 12 of the conveyor and supports the various components of the holdback bar assembly. Many of the components of the assembly are known in the prior art and therefore will only be described generally. The assembly includes the holdback bar 34 that extends laterally across the longitudinal length of the conveying surface 12. The holdback bar 34 is suspended by one or more rods 36 that extend upwardly from the bar and in turn are suspended by a chain 38 of a chain drive mechanism 42 supported on the frame 32. The chain drive mechanism 42 is driven by a motor 44 to selectively raise and lower the holdback bar 34 relative to the conveying surface 12. In the lowered position of the holdback bar 34 relative to the conveying surface 12 shown in FIG. 2, the bar is positioned to contact with the objects 26 conveyed on the conveying surface and holdback the objects from moving further downstream as the conveying surface continues to move beneath the layer of objects. When the holdback bar is elevated to its raised position over the conveying surface shown by the dashed lines 46 of FIG. 2, the holdback bar is positioned to release the previously held back layer of objects 26 and allow the layer of objects to be further conveyed in the downstream direction by the conveying surface 12.

The holdback bar assembly 24 is provided with an actuator 52 that is connected between the frame 32 and the rod 36 suspending the holdback bar 34. The actuator 52 enables limited longitudinal movement of the holdback bar 34 between first and second positions of the bar relative to the conveying surface 12. In the first position 54 of the bar 34 shown in FIG. 2 a two dimensional arrayed layer of objects 26 conveyed on the conveying surface 12 is held back by the bar 34 and is positioned at a desired position along the conveyor apparatus where a further process in the palletizing of the arrayed layer of objects can be performed on the objects. In the illustrative environment, the holdback bar 34 is shown in its first position in FIG. 2 holding the two dimensional arrayed layer of objects 26 on the conveying surface 12 in a position where the tier sheet 28 can be deposited on top of the arrayed layer of objects. The second position 56 of the holdback bar 34 is shown partially in FIG. 2. In the second position 56 the holdback bar 34 is spaced longitudinally in the downstream direction from the first position 54 of the bar. The pivoting connection provided by the chain drive 42 enables the holdback bar 34 to move through an arch from its first position 54 toward its second position 56, and to move back from its second position 56 to its first position 54. The holdback bar 34 is moved from the first position 54 toward the second position 56 while it is simultaneously elevated to its raised position in releasing the held back layer of objects 26 for further downstream movement by the conveying surface 12.

Figure 3:
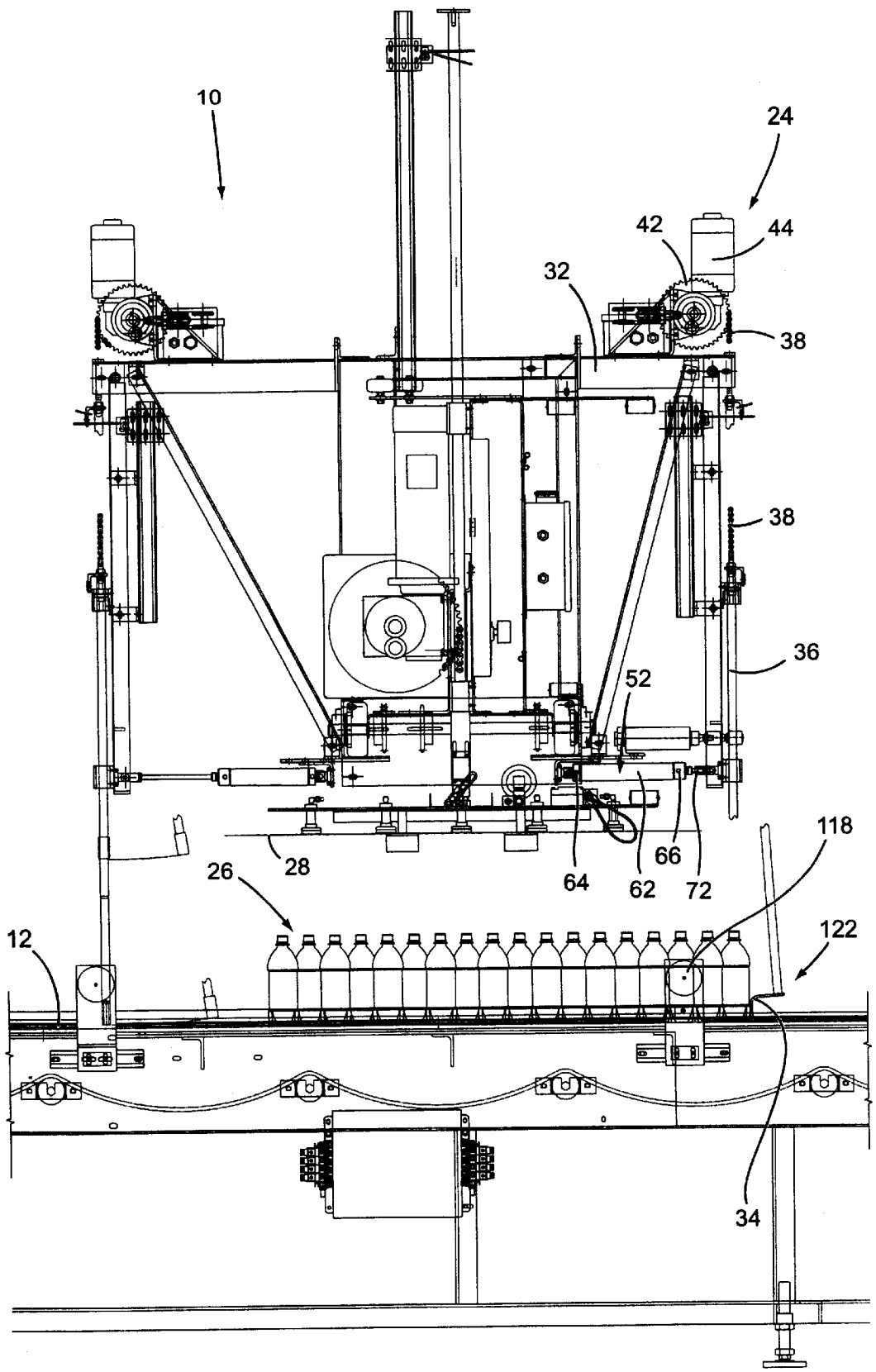
FIG. 3 is a view similar to FIG. 2 but showing different positions of the cushioning holdback bar relative to the conveyor; and, FIG. 4 is a schematic representation of a fluid circuit that controls the operation of the holdback bar.

The actuator 52 is a double acting pneumatic cylinder and piston assembly. The cylinder 62 of the assembly is provided with a first air port 64 and a second air port 66 at opposite ends of the cylinder, as is conventional. Supplying air pressure to the first port 64 and exhausting air from the second port 66 causes a piston 68 (shown schematically in FIG. 4) in the cylinder and its attached piston rod 72 to be extended from the cylinder or to move to the right as shown in FIGS. 1, 2 and 3. Supplying air pressure to the second port 66 of the cylinder while exhausting the first port 64 causes the piston 68 and its connected piston rod 72 to move to the retracted position or to the left as shown in FIGS. 1, 2 and 3. With the piston rod 72 of the actuator 52 being attached to the holdback bar rod 36, extending and retracting the piston rod 72 relative to the actuator cylinder 62 causes the holdback bar 34 to move from its first position 54 toward its second position 56, and to move from its second position 56 to its first position 54, respectively.

A novel fluid pressure circuit of the invention communicates with the actuator 52 and controls the operation of the actuator. The fluid pressure circuit 74 is shown schematically in FIG. 4. The actuator cylinder 62, piston 68 and piston rod 72 are also shown schematically in FIG. 4.

The fluid pressure circuit 74 of the invention comprises three solenoid operated valves 76, 78, 82. The circuit communicates with a main air supply or air pressure source 84 of the conveyor system. The air pressure source 84 in the illustrative environment is regulated to 60 psi. However, depending on the size of the conveyor system and the size of the objects being conveyed by the system, as well as the speed at which the system is operated, the air pressure source may be changed. The air pressure source 84 communicates directly with the first valve 76 of the three solenoid operated valves through a first supply conduit 86. The main air supply 84 also communicates with a pressure regulator 88 that reduces the air pressure supplied by the regulator to a second conduit 92. In the illustrative environment the pressure regulator 88 reduces the air pressure in the second conduit 92 to 6 psi. Again however, depending on the size and speed of the conveyor and the size of conveyed objects, the reduced or lower pressure provided by the pressure regulator 88 could vary. The second conduit 92 communicates through a third conduit 94 with the second valve 78 and communicates through a fourth conduit 96 with a third valve 82 of the three solenoid operated valves. A check valve 98 is provided in the second conduit 92 and permits air flow from the pressure regulator 88, but prevents the reverse direction of air flow.

The first solenoid operated valve 76 communicates through a fifth conduit 100 and through a sixth conduit 102 with the first port 64 of the actuator cylinder 62. A check valve 104 is positioned in the fifth conduit 100 and permits air flow away from the first valve 76 but prevents the reverse flow of air. The second solenoid valve 78 communicates through a seventh conduit 106 and through the sixth conduit 102 with the first port 64 of the actuator cylinder 62. The third solenoid valve 82 communicates through an eighth conduit 108 with the second port 66 of the actuator cylinder 62.

The three solenoid valves 76, 78, 82 are three way valves. The three valves 76, 78, 82 are each shown in their at rest positions in FIG. 4. In the at rest positions of the three valves the first conduit 86, third conduit 94 and fourth conduit 96 are all blocked by the three valves. In addition, the fifth conduit 100, seventh conduit 106 and eighth conduit 108 are all communicated with exhausts 114 through the valves. When each of the valves are energized they move to their second positions. In the second position of the first valve 76 the first conduit 86 is communicated with the fifth conduit 100 to supply high pressure air to the fifth conduit 100. While the reverse flow of air from the first port 64 of the actuator 52, through the sixth conduit 102, the fifth conduit 100 and to the first valve 76 exhaust port 114 is prevented by the check valve 104, the reverse flow of air through the sixth conduit 102 is allowed through the seventh conduit 106 and the exhaust port 114 of the second valve 78. In the second position of the second valve 78 the third conduit 94 is communicated with the seventh conduit 106 providing low pressure air from the pressure regulator 88 to the seventh conduit. In the second position of the third valve 82 low pressure air is provided by the fourth conduit 96 to the eighth conduit 108.

Figure 4:
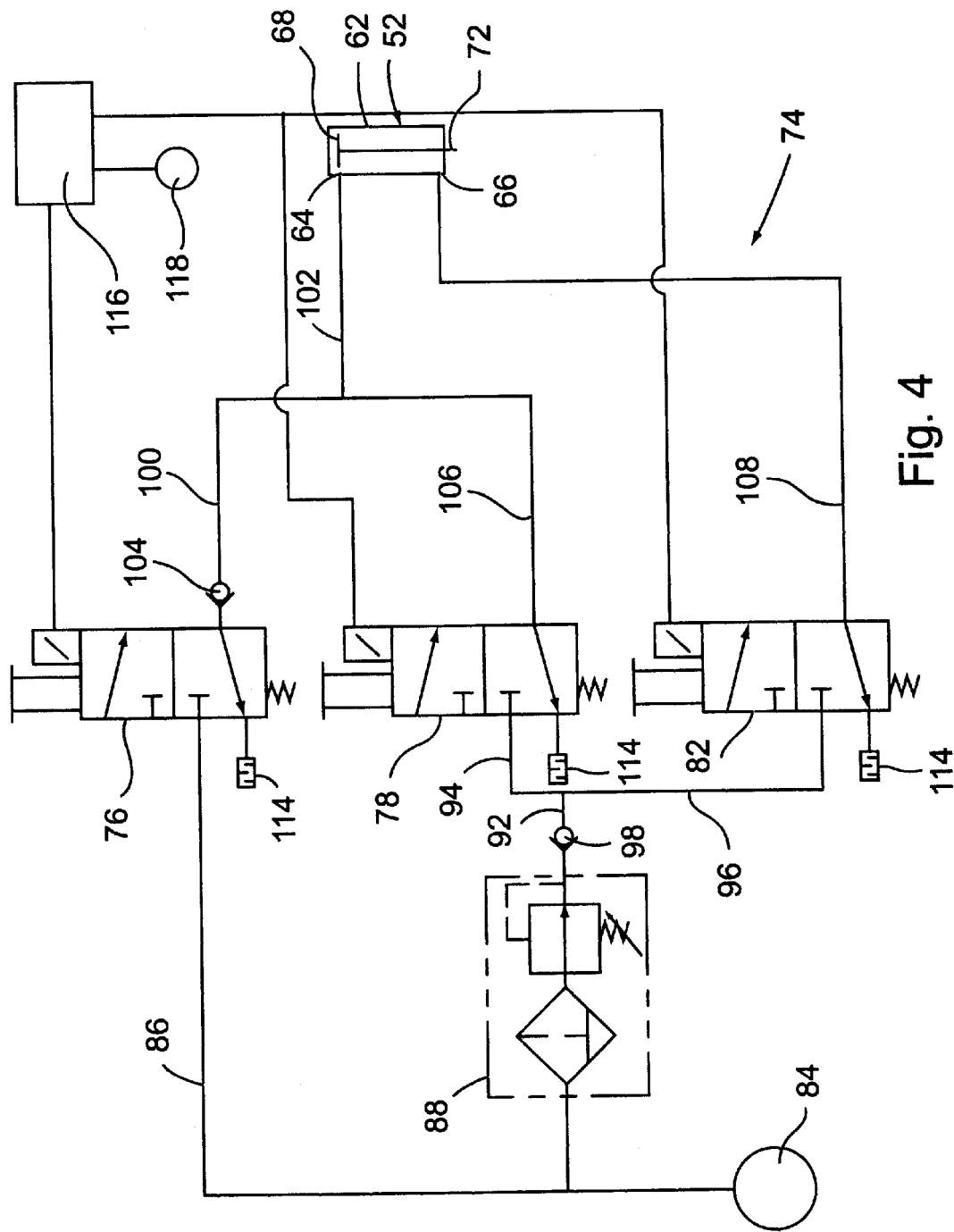

The operation of the three solenoid valves 76, 78, 82 is controlled by a programmable logic computer 116 shown schematically in FIG. 4. The programmable logic computer 116 communicates with a sensor 118 shown in FIGS. 1–3 positioned along the conveying surface 12 adjacent to the holdback bar 34 when the holdback bar is in its first position. In the preferred embodiment, the sensor 118 is a photo sensor, however other types of sensors may be employed.

In operation of the conveyor cushioning holdback bar assembly 24 with the holdback bar 34 in its normal state of operation, the bar 34 is held in its first position 54 shown in FIG. 2 by the programmable logic computer (PLC) controlling the third solenoid valve 82 to be energized and supply low pressure air from the fourth conduit 96 through the third valve 82 and the eighth conduit 108 to the second port 66 of the actuator cylinder 62. This retracts the piston 68 and piston rod 72 of the actuator in the actuator cylinder, thus holding the holdback bar 34 in its first 54 or home position shown in FIG. 2. Further, in the normal state of the holdback bar 34 the first valve 76 and second valve 78 are de-energized and prevent air flow to the fifth conduit 100 and the sixth conduit 106, respectively.

As the layer of objects 26 conveyed on the conveying surface 12 approaches the holdback bar, the layer will eventually reach the sensor 118 positioned along the conveying surface. The sensor 118 senses the presence of the arrayed layer of objects 26 approaching the holdback bar 34 and provides a signal to the PLC. On receiving the signal from the sensor 118 the PLC 116 de-energizes the third solenoid valve 82. With all three valves 76, 78, 82 de-energized the actuator first port 64 is exhausted through the sixth conduit 102, the seventh conduit 106 and the second solenoid valve 78 and the actuator second port 66 is exhausted through the eighth conduit 108 and the third solenoid valve 82. This puts the actuator 52 in a neutral state with no air being supplied to either end of the actuator cylinder. Thus, the piston 68 and piston rod 72 as well as the holdback bar 34 are free floating.

The PLC 116 also generates a short adjustable first time delay in response to receiving the signal from the sensor 118. The first time delay is determined to coincide with the approach and downstream movement of the layer of objects 26 on the conveying surface 12 to activate controlling the fluid circuit to supply the actuator 52 with low pressure air that causes the piston 68 and piston rod 72 to move toward their extended positions relative to the actuator cylinder such that just prior to the layer of objects 26 contacting the holdback bar 34, the holdback bar 34 will begin moving in the downstream direction. At the expiration of the first time delay the PLC 116 controls the second solenoid valve 78 to energize. This supplies low pressure air from the pressure regulator 88 through the second conduit 92, through the third conduit 94 and the second solenoid valve 78, through the seventh conduit 106 and the sixth conduit 102 to the first port 64 of the actuator cylinder 62. This causes the piston rod 72 to be extended from the cylinder 62 at a slow rate, which in turn causes the holdback bar 34 to move in the downstream direction from the bar first position 54 toward the second position 56 at a reduced rate of speed compared to the speed of movement of the layer of objects 26 being conveyed by the conveying surface.

The difference in the rate of speed of the holdback bar 34 in the downstream direction and the rate of speed of the layer of objects 26 being conveyed in the downstream direction results in the layer of objects 26 catching up to and coming into contact with the slower moving holdback bar 34 at an intermediate position 122 of the holdback bar 34, shown in FIG. 3 between the first 54 and second position 56 of the bar. This results in a more gentle impact of the layer with the bar as compared to the layer of objects being stopped by a stationary holdback bar. As the layer of objects 26 contacts the slower moving holdback bar 34, the layer of objects is restrained from moving at the higher speed of the conveying surface 12 to move at the slow speed of the holdback bar 34. This causes the conveyed layer of objects 26 to be slowed down and creates a cushioning effect of the holdback bar 34 as it brings the layer of objects 26 to a decelerated stop on the conveying surface 12. As will be discussed, the holdback bar 34 will be controlled by the PLC 116 to reverse its direction and move back to its home position. In this way, the actuator 52 of the holdback bar 34 functions as a shock absorber as it brings the layer of objects 26 conveyed on the conveying surface 12 to a stop.

A second time delay is generated by the PLC 116 to control the time that the second solenoid valve 78 supplies low pressure air to the first port 64 of the actuator 52. Following the second time delay, the PLC 116 then controls the second solenoid valve 78 to be de-energized and the third solenoid valve 82 to energize. This causes the first port 64 of the actuator cylinder to exhaust through the sixth conduit 102, the seventh conduit 106 and the second solenoid valve 78. The low pressure air from the pressure regulator 88 is supplied to the second port 66 of the actuator cylinder through the second conduit 92, the fourth conduit 96, the third solenoid valve 82 and the eighth conduit 108. The low pressure air supplied to the actuator cylinder second port 66 causes the piston 68 and piston rod 72 of the actuator to move toward the retracted positions relative to the cylinder 62. This in turn causes the holdback bar 34 to move to its first position 54 and move the two dimensional arrayed layer of objects 26 in a slow motion in an upstream direction, opposite the downstream direction, over the conveying surface 12. The two dimensional arrayed layer of objects is gently forced to move upstream against the downstream motion of the conveying surface 12 until the holdback bar reaches its first position 54 shown in FIG. 2. The further packaging procedures can then be performed on the arrayed layer of objects 26, for example the tier sheet 28 can then be placed on the top of the layer of objects.

When the held back layer of objects 26 and its tier sheet 28 are ready for further downstream movement along the conveyor system, the PLC 116 controls the third solenoid 82 to de-energize and energizes the first solenoid valve 76 and the second solenoid valve 78 simultaneously. De-energizing the third solenoid valve 82 exhaust the second port 66 of the actuator cylinder through the eighth conduit 108 and the third valve 82. The energized first solenoid valve 76 provides high pressure air from the first conduit 86 through the first solenoid valve 76, the fifth conduit 100 and the sixth conduit 102 to the first port 64 of the actuator cylinder 62. The energized second solenoid valve 78 communicates the seventh conduit 106 through the valve 78 with the third conduit 94 and second conduit 92. However, the check valve 98 in the second conduit 92 prevents the high pressure air from back flowing through the regulator 88. The high pressure air in the third conduit 94 and the fourth conduit 96 is blocked from passing through the third valve 82 because the third valve 82 is de-energized. The high pressure air supplied by the first valve 76 to the first port 64 of the actuator 52 causes the piston 68 and piston rod 72 of the actuator to move quickly to their extended positions relative to the cylinder 62. As the piston 68 moves through the cylinder 62 the low pressure air in the cylinder is exhausted through the second port 66, the eighth conduit 108 and the third solenoid valve 82 to the exhaust 114.

The forward or downstream stroke of the piston 68 and piston rod 72 rapidly moves the holdback bar 34 in the downstream direction separating the bar from the held back two dimensional arrayed layer of objects 26. Simultaneously, the motor 44 and chain drive 42 of the holdback bar assembly 24 are activated causing the holdback bar 34 to be elevated to its raised position 46 relative to the conveying surface 12 shown partially in FIG. 2. The downstream and upward movement of the holdback bar 34 allows the two dimensional arrayed layer of objects 26 conveyed on the conveying surface 12 to clear the holdback bar as the layer of objects moves in the downstream direction.

After the layer of objects 26 conveyed by the conveying surface 12 has cleared the area of the holdback bar assembly 24 as sensed by the sensor 118, the PLC 116 then controls the holdback bar motor 44 and chain drive 46 to lower the holdback bar 34. In addition, the PLC 116 de-energizes the first solenoid valve 76 and second solenoid valve 78 while energizing the third solenoid valve 82. This exhausts the actuator cylinder first port 64 through the sixth conduit, the seventh conduit and the second valve 78 and supplies low pressure air to the second port 66 of the actuator cylinder 62 that causes the holdback bar 34 to return to its first position 54 relative to the conveying surface 12.

The conveyor apparatus of the present invention overcomes the shortcomings of prior art conveyor apparatus by providing a cushioning holdback bar. The cushioning holdback bar cushions the impact of two dimensional arrayed layers of objects with the holdback bar in holding back the layer of objects on the conveying surface and thereby prevents objects in the last row(s) of the layer from falling over on their sides due to the impact of the layer with the holdback bar. As a result, the conveying surface of the conveyor apparatus can be operated at increased speeds without the drawback of the two dimensional arrayed layer of objects impacting with the holdback bar causing several of the objects in the last row(s) of the layer to fall over. Because the cushioning holdback bar of the invention enables the conveying surface of the apparatus to be operated at an increased speed, the cost efficiency of the conveyor apparatus is increased.

What is claimed is:

1. A conveyor apparatus that conveys a plurality of objects, the apparatus comprising:

a conveying surface having a longitudinal length with opposite upstream and downstream ends, the conveying surface being dimensioned to support a plurality of objects conveyed on the conveying surface in a downstream direction from the conveying surface upstream end to the conveying surface downstream end;

a holdback bar extending laterally across the conveying surface, the holdback bar being moveable vertically between lowered and raised positions of the holdback bar relative to the conveying surface where in the lowered position the holdback bar is adjacent the conveying surface where the holdback bar will contact objects conveyed on the conveying surface and hold back the objects from being conveyed in the downstream direction on the conveying surface and in the raised position the holdback bar is elevated above the conveying surface where the holdback bar will not contact objects conveyed on the conveying surface and allows the objects to be conveyed in the downstream direction on the conveying surface, and the holdback bar being moveable longitudinally between first and second longitudinally spaced positions of the holdback bar relative to the conveying surface where the holdback bar moves from the first position toward the second position in response to the objects conveyed on the conveying surface approaching contact with the holdback bar, and;

an actuator operatively connected to the holdback bar, the actuator being selectively operable to move the holdback bar between the first position and the second position of the holdback bar relative to the conveying surface.

2. The apparatus of claim 1, further comprising:

the second position of the holdback bar being spaced in the downstream direction from the first position of the holdback bar.

3. The apparatus of claim 2, further comprising:

the actuator being operative to move the holdback bar from the first position of the holdback bar toward the second position of the holdback bar.

4. The apparatus of claim 3, further comprising:

the conveying surface being moveable in the downstream direction.

5. The apparatus of claim 4, further comprising:

the conveying surface being dimensioned to support a two dimensional array of objects on the conveying surface.

6. The apparatus of claim 2, further comprising:

the actuator being selectively operable to move the holdback bar from the first position toward the second position and to subsequently move the holdback bar back to the first position.

7. The apparatus of claim 6, further comprising:

the actuator being a cylinder and piston assembly.

8. A conveyor apparatus that conveys a plurality of objects, the apparatus comprising:

a conveying surface having a longitudinal length with opposite upstream and downstream ends, the conveying surface being dimensioned to support a plurality of objects conveyed on the conveying surface in a downstream direction from the conveying surface upstream end to the conveying surface downstream end;

a holdback bar extending laterally across the conveying surface, the holdback bar being moveable vertically between lowered and raised positions of the holdback bar relative to the conveying surface where in the lowered position the holdback bar is adjacent the conveying surface where the holdback bar will contact objects conveyed on the conveying surface and hold back the objects from being conveyed in the downstream direction on the conveying surface and in the raised position the holdback bar is elevated above the conveying surface where the holdback bar will not contact objects conveyed on the conveying surface and allows the objects to be conveyed in the downstream direction on the conveying surface, and the holdback bar being moveable longitudinally between first and second longitudinally spaced positions of the holdback bar relative to the conveying surface where the holdback bar moves from the first position toward the second position in response to the objects conveyed on the conveying surface approaching contact with the holdback bar;

the second position of the holdback bar being spaced in the downstream direction from the first position of the holdback bar;

an actuator operatively connected to the holdback bar, the actuator being selectively operable to move the holdback bar from the first position toward the second position and to subsequently move the holdback bar back to the first position; and, the actuator being a double-acting cylinder and piston assembly with first and second ports on the cylinder; and, a fluid circuit communicating with the cylinder first and second ports, the fluid circuit being operable to selectively supply fluid pressure to the cylinder first and second ports to selectively move the holdback bar.

9. The apparatus of claim 8, further comprising:

a plurality of valves in the fluid circuit that are operable to selectively supply at least two different fluid pressures to the cylinder first and second ports.

10. A conveying apparatus that conveys a plurality of objects, the apparatus comprising:

a conveying surface having a longitudinal length with opposite upstream and downstream ends, the conveying surface supporting a plurality of objects conveyed on the conveying surface from the upstream end to the downstream end;

a holdback bar extending laterally across the conveying surface, the holdback bar being moveable vertically between raised and lowered positions relative to the conveying surface where in the raised position the holdback bar is elevated above the conveying surface and does not hold back objects conveyed on the conveying surface and in the lowered position the holdback bar is adjacent the conveying surface and contacts and holds back objects conveyed on the conveying surface; and, an actuator operatively connected to the holdback bar, the actuator being operable to selectively move the holdback bar longitudinally relative to the conveying surface length.

11. The apparatus of claim 10, further comprising:

the actuator being operatively connected to the holdback bar to allow limited longitudinal movement of the holdback bar toward the conveying surface downstream end in response to the holdback bar being contacted by objects conveyed on the conveying surface.

12. The apparatus of claim 10, further comprising:

the holdback bar being moveable vertically and longitudinally relative to the conveying surface.

13. The apparatus of claim 10, further comprising:

the conveying surface being a moveable surface that moves in a downstream direction from the conveying surface upstream end to the conveying surface downstream end.

14. The apparatus of claim 13, further comprising:

the actuator being a cylinder and piston assembly.

15. A conveying apparatus that conveys a plurality of objects, the apparatus comprising a conveying surface having a longitudinal length with opposite upstream and downstream ends, the conveying surface supporting a plurality of objects conveyed on the conveying surface from the upstream end to the downstream end;

a holdback bar extending laterally across the conveying surface, the holdback bar being moveable vertically between raised and lowered positions relative to the conveying surface where in the raised position the holdback bar is elevated above the conveying surface and does not hold back objects conveyed on the conveying surface and in the lowered position the holdback bar is adjacent the conveying surface and contacts and holds back objects conveyed on the conveying surface;

a shock absorber operatively connected to the holdback bar to allow limited longitudinal movement of the holdback bar in response to the holdback bar being contacted by objects conveyed on the conveying surface;

the conveying surface being an moveable surface that moves in a downstream direction from the conveying surface upstream end to the conveying surface downstream end;

the shock absorber being a cylinder and piston assembly; and, a fluid pressure circuit communicating with the cylinder and piston assembly, the fluid pressure circuit being operable to selectively supply fluid pressure to the cylinder and piston assembly to selectively move the holdback bar longitudinally.

16. The apparatus of claim 15, further comprising:

a plurality of valves in the fluid pressure circuit that control the selective supply of fluid pressure to the cylinder and piston assembly.

17. The apparatus of claim 16, further comprising:

the plurality of valves being operable to selectively supply at least two different fluid pressures to the cylinder and piston assembly.

18. A conveyor apparatus that conveys a plurality of objects, the apparatus comprising:

a conveying surface having a longitudinal length with opposite upstream and downstream ends, the conveying surface being moveable in a downstream direction from the upstream end to the downstream end, the conveying surface being dimensioned to support a plurality of objects on the conveying surface and convey the objects in the downstream direction;

a frame extending above the conveying surface;

a holdback bar supported by the frame above the conveying surface, the holdback bar extending laterally across the conveying surface and being moveable between lowered and raised positions of the holdback bar relative to the conveying surface where in the lowered position the holdback bar is adjacent the conveying surface where the holdback bar will contact objects conveyed on the conveying surface and hold back the objects from being moved in the downstream direction by the conveying surface and in the raised position the holdback bar is elevated above the conveying surface where the holdback bar will not contact objects conveyed on the conveying surface and allows the objects to be moved in the downstream direction by the conveying surface; and an actuator operatively connected between the frame and the holdback bar, the actuator being operable to selectively move the holdback bar longitudinally relative to the conveying surface.

19. A conveyor apparatus that conveys a plurality of objects, the apparatus comprising:

a conveying surface having a longitudinal length with opposite upstream and downstream ends, the conveying surface being moveable in a downstream direction from the upstream end to the downstream end, the conveying surface being dimensioned to support a plurality of objects on the conveying surface and convey the objects in the downstream direction;

a frame extending above the conveying surface;

a holdback bar supported by the frame above the conveying surface, the holdback bar extending laterally across the conveying surface and being moveable between lowered and raised positions of the holdback bar relative to the conveying surface where in the lowered position the holdback bar is adjacent the conveying surface where the holdback bar will contact objects conveyed on the conveying surface and hold back the objects from being moved in the downstream direction by the conveying surface and in the raised position the holdback bar is elevated above the conveying surface where the holdback bar will not contact objects conveyed on the conveying surface and allows the objects to be moved in the downstream direction by the conveying surface;

a shock absorber operatively connected between the frame and the holdback bar, the shock absorber being operative to allow limited longitudinal movement of the holdback bar in response to the holdback bar contacting objects convened on the conveying surface;

the shock absorber being a double acting cylinder and piston assembly with first and second ports on the cylinder; and, a fluid circuit communicating with the cylinder first and second ports, the fluid circuit being operable to selectively supply fluid pressure to the cylinder first and second ports to selectively move the holdback bar between first and second longitudinally spaced positions of the holdback bar relative to the conveying surface.

20. The apparatus of claim 19, further comprising:

a plurality of valves in the fluid circuit that are operable to selectively supply at least two different fluid pressures to the cylinder first and second ports.

* * * * *